United States Patent
Arima et al.

(10) Patent No.: US 11,165,914 B2
(45) Date of Patent: Nov. 2, 2021

(54) INFORMATION PROCESSING APPARATUS AND CONTROL METHOD THEREOF

(71) Applicant: CANON KABUSHIKI KAISHA, Tokyo (JP)

(72) Inventors: Makoto Arima, Abiko (JP); Yuya Hasegawa, Abiko (JP); Satoru Ikeda, Kashiwa (JP); Yoshikazu Sato, Nagareyama (JP); Kazuhiro Oyoshi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/818,205

(22) Filed: Mar. 13, 2020

(65) Prior Publication Data
US 2020/0314255 A1 Oct. 1, 2020

(30) Foreign Application Priority Data
Mar. 25, 2019 (JP) .............................. JP2019-056273

(51) Int. Cl.
*H04N 1/00* (2006.01)
*G06F 3/14* (2006.01)

(52) U.S. Cl.
CPC ....... *H04N 1/00076* (2013.01); *H04N 1/0001* (2013.01); *H04N 1/00037* (2013.01)

(58) Field of Classification Search
None
See application file for complete search history.

(56) References Cited

U.S. PATENT DOCUMENTS

| | | | | |
|---|---|---|---|---|
| 5,432,907 A | * | 7/1995 | Picazo, Jr. | H04L 12/44 370/401 |
| 5,519,832 A | * | 5/1996 | Warchol | G06F 11/22 714/46 |
| 5,588,144 A | | 12/1996 | Inoue et al. | |
| 6,061,391 A | | 5/2000 | Sasaki et al. | |
| 6,157,956 A | * | 12/2000 | Jensen | G06F 11/3068 709/246 |
| 2007/0262977 A1 | * | 11/2007 | Liu | G09G 5/00 345/211 |
| 2008/0030362 A1 | * | 2/2008 | Huang | H04L 41/22 340/815.45 |
| 2009/0300640 A1 | * | 12/2009 | Akitomi | G06F 9/5077 718/104 |
| 2010/0062805 A1 | * | 3/2010 | Moran | H04M 1/72527 455/556.1 |
| 2010/0095145 A1 | | 4/2010 | Chan et al. | |
| 2011/0131437 A1 | * | 6/2011 | Shimazaki | G06F 1/3203 713/323 |
| 2012/0290884 A1 | * | 11/2012 | Hamaguchi | G06F 1/00 714/49 |

(Continued)

FOREIGN PATENT DOCUMENTS

JP 2015-108593 A 6/2015
WO 2017152977 A1 9/2017

*Primary Examiner* — Beniyam Menberu
(74) *Attorney, Agent, or Firm* — Canon U.S.A., Inc. IP Division

(57) ABSTRACT

A light emitting diode (LED) which is turned ON by a local area network (LAN) controller, is controlled to be turned ON by a central processing unit (CPU), which executes a program, in accordance with an execution status of the program.

17 Claims, 5 Drawing Sheets

(56) References Cited

U.S. PATENT DOCUMENTS

2016/0133112 A1* 5/2016 Kawamoto ............. G08B 5/36
                                                    340/664
2016/0316072 A1* 10/2016 Mori ................... H04N 1/0049
2017/0123954 A1* 5/2017 Shih .................... G06F 11/3034
2020/0314249 A1* 10/2020 Ikeda .................. H04N 1/0001
2020/0314255 A1 10/2020 Arima
2020/0314256 A1* 10/2020 Hasegawa ........... H05B 47/175

* cited by examiner

LED 132 FOR NOTIFICATION: OFF
LED 133 FOR NOTIFICATION: OFF

LED 132 FOR NOTIFICATION: ON
LED 133 FOR NOTIFICATION: OFF

LED 132 FOR NOTIFICATION: OFF
LED 133 FOR NOTIFICATION: ON

LED 132 FOR NOTIFICATION: OFF
LED 133 FOR NOTIFICATION: BLINKING

INFORMATION PROCESSING APPARATUS AND CONTROL METHOD THEREOF

BACKGROUND

Field

The present disclosure relates to a method of performing turning-ON/OFF control of a light emitting unit.

Description of the Related Art

A conventional information processing apparatus, such as a personal computer and a copy machine, notifies a user or a service engineer of an abnormality of the apparatus. Referring the notification, the user can properly perform recovery processing of the apparatus and the service engineer can identify a part for recovering the apparatus.

Japanese Patent Application Laid-Open No. 2015-108593 discusses a system in which a voltage monitoring circuit monitoring a rise in each system voltage generated in a power supply circuit issues a notification of an abnormality in the system voltages by turning ON/OFF a light emitting diode (LED) that is turned ON/OFF by a local area network (LAN) controller.

SUMMARY

However, in accordance with an aspect of the present disclosure, it has now been determined that according to Japanese Patent Application Laid-Open No. 2015-108593, an execution unit which executes a program such as a central processing unit (CPU) does not turn ON/OFF the LEI) that is turned ON/OFF by a communication unit such as the LAN controller. More specifically, according to Japanese Patent Application Laid-Open No. 2015-108593, an execution status of a program such as progress of a program cannot be notified using the LED that is turned ON/OFF by the communication unit, and thus when an apparatus stops in the middle of activation, for example, the user cannot identify at which phase of a boot program activation processing stops.

According to another aspect of the present disclosure, an information processing apparatus includes a connector to which a communication cable to communicate with an external apparatus can be connected, a light emitting unit disposed to the connector, an execution unit configured to execute a program, and a communication unit configured to communicate with the external apparatus via the connector and perform turning-ON/OFF cot of the light emitting unit in accordance with a status of communication with the external apparatus, wherein the execution unit is configured to perform the turning-ON/OFF control of the light emitting unit in accordance with an execution status of the program.

Further features of the present disclosure will become apparent from the following description of exemplary embodiments with reference to the attached drawings.

DESCRIPTION OF THE EMBODIMENTS

The following describes an exemplary embodiment of the present disclosure with reference to the accompanying drawings.

A configuration of the exemplary embodiment described below is a mere example, and the present disclosure is not limited to the illustrated configuration.

Figure 1:
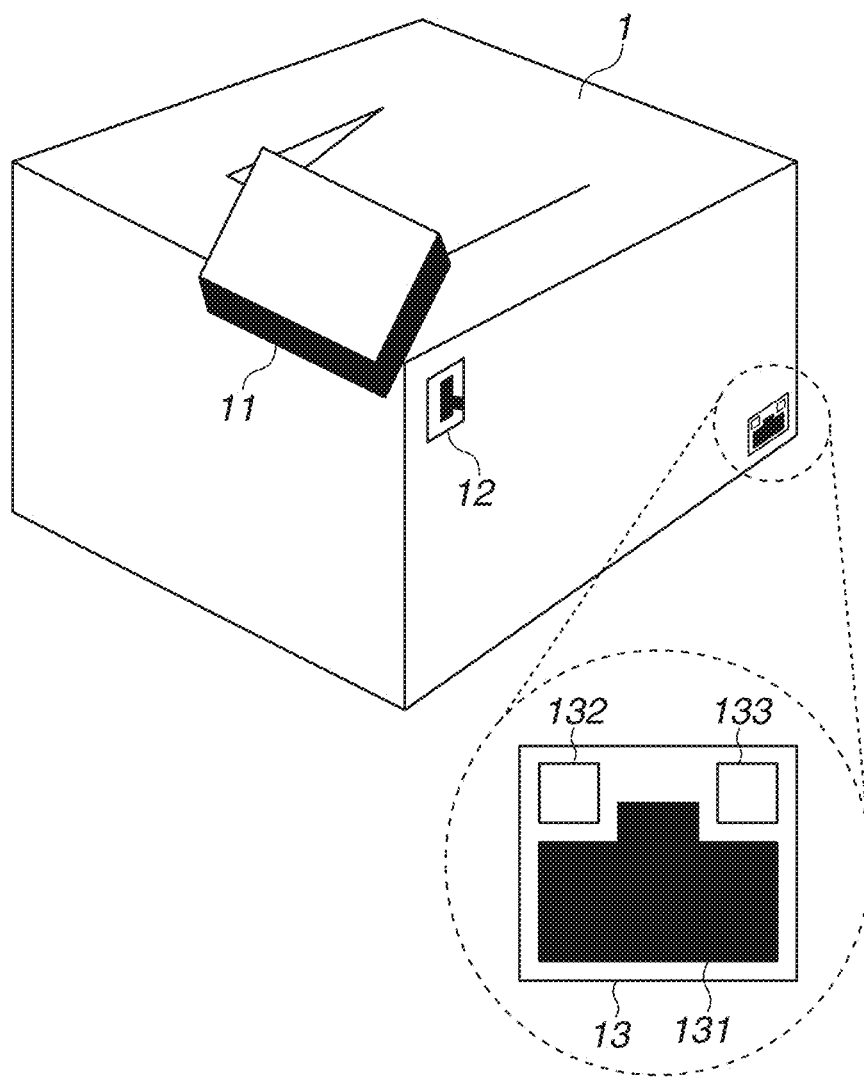
FIG. 1 is a schematic diagram illustrating an information processing apparatus.

FIG. 1 is a schematic diagram illustrating an information processing apparatus according to the present exemplary embodiment.

An information processing apparatus 1 includes a display unit 11, a power switch 12, and a local area network (LAN) connector 13. The information processing apparatus 1 according to the present exemplary embodiment may be a printing apparatus with a printing function or a readout apparatus with a document scanning function, and is not limited to a specific type of apparatuses. If the information processing apparatus 1 is the printing apparatus having the printing function, the information processing apparatus 1 includes a printer engine for printing an image of print data received from an external network of the printing apparatus by a LAN controller 206 described below. If the information processing apparatus 1 is the readout apparatus having the document scanning function, the information processing apparatus 1 includes a scanner for scanning an original document, and the LAN controller 206 transmits the scanned image of the original document by the scanner to the external network of the readout apparatus.

The display unit 11 has a function to display graphics data stored in the information processing apparatus 1. The display unit 11 may further have a function, such as a touch panel and a button, to allow a user to select an object displayed on the information processing apparatus 1.

The power switch 12 controls a power supply status of the information processing apparatus 1. When the power switch 12 is in a conductive state (ON state), power is supplied to the information processing apparatus 1. When the power switch 12 is in a non-conductive state (OFF state), power is not supplied to the information processing apparatus 1.

The LAN connector 13 is used for communication with the outside of the information processing apparatus 1 by a LAN cable (communication cable) connected to the LAN connector 13. The LAN connector 13 includes a LAN cable connection unit 131, and light emitting diodes (LEDs) 132 and 133 that are used for notification of a current communication status when the LAN cable connection unit 131 and the LAN cable are connected to each other. One end of the LAN cable is connected to the LAN cable connection unit 131, and the other end of the LAN cable is connected to an external apparatus (e.g., hub). The information processing apparatus 1 includes the after-mentioned LAN controller 206 that transmits and receives data to and from the external apparatus via the LAN cable. That is, the LAN cable transmits data between the two apparatuses.

Figure 2:
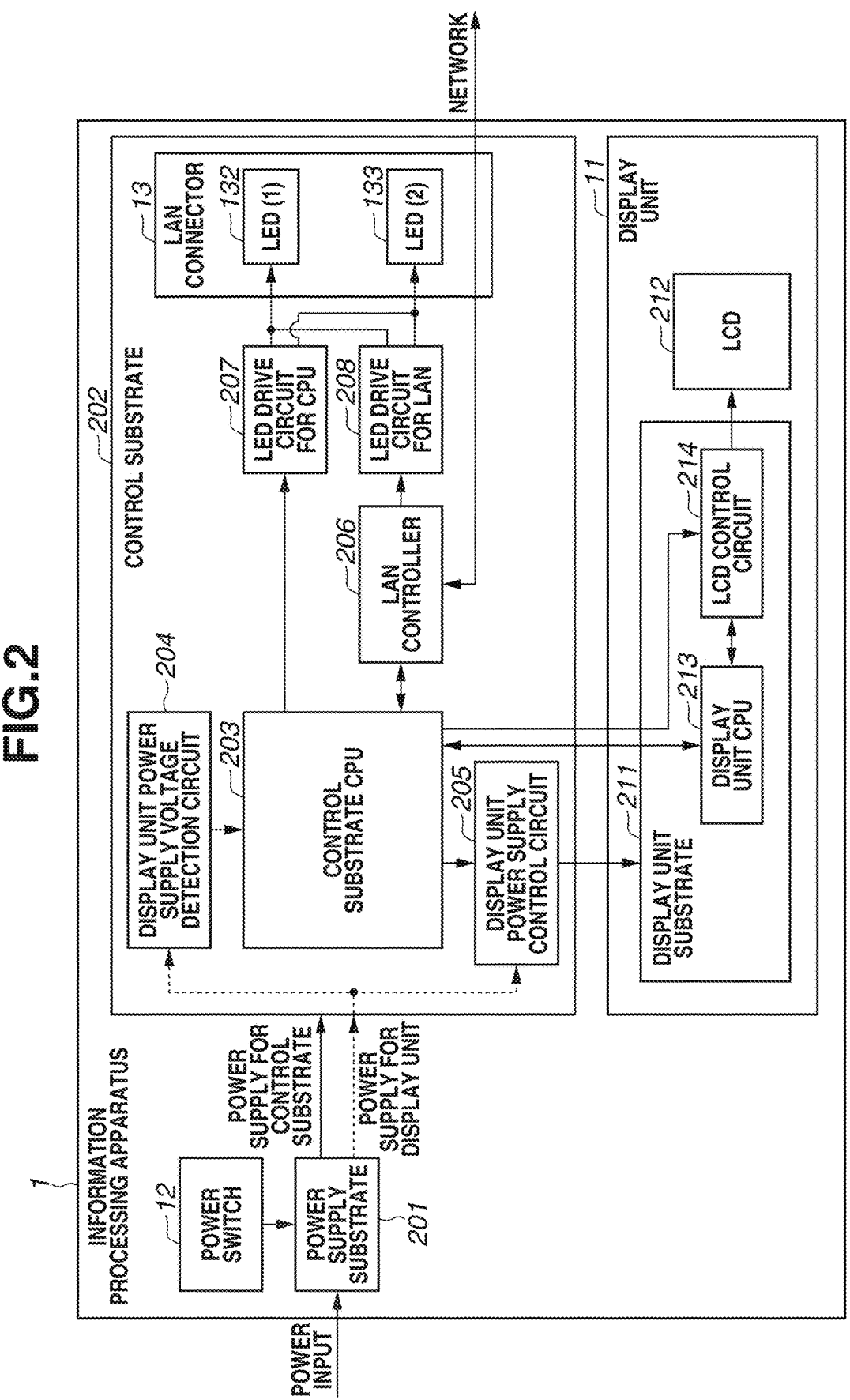
FIG. 2 is a block diagram illustrating an example of hardware configuration of the display apparatus.

FIG. 2 is a block diagram illustrating an example of hardware configuration of the information processing apparatus 1. The information processing apparatus 1 also includes a power supply substrate 201 and a control substrate 202, in addition to the display unit 11, the power switch 12, and the LAN connector 13.

The power supply substrate 201 is connected to an external power supply (e.g., alternating current (AC) 100 V), the power switch 12, and the control substrate 202. When the power switch 12 is turned ON, the power supply substrate 201 generates a power supply voltage (e.g., direct current (DC) 5 V) for an operation of the control substrate 202 and a power-supply voltage (e.g., DC 24 V) for an operation of the display unit 11, and supplies the voltages to the control substrate 202. That is, the power supply substrate 201 serves as a function for supplying powers at different voltages to the control substrate 202 and the display unit 11. The power supply substrate 201 supplies powers at different voltages to the corresponding units in a predetermined order. For example, the power supply substrate 201 starts to supply power at DC 5 V to the control substrate 202, and then starts to supply power at DC 24 V to the display unit 11.

The control substrate 202 has a function of communicating with the external apparatus using the LAN connector 13 and a function of generating image data to be displayed on the display unit 11, transmitting the image data to the display unit 11, and controlling a power supply to the display unit 11. The control substrate 202 includes a control substrate central processing unit (CPU) 203 (herein after referred to as CPU 203), a display unit power supply voltage detection circuit 204, a display unit power supply control circuit 205, the LAN controller 206, an LED drive circuit for CPU 207, an LED drive circuit for LAN 208, and the LAN connector 13.

The control substrate CPU 203 is a central processing unit that controls the entire information processing apparatus 1. The control substrate CPU 203 is connected to the display unit power supply voltage detection circuit 204 described below, the display unit power supply control circuit 205, the LAN controller 206, the LED drive circuit for CPU 207, a display unit CPU 213, and a liquid crystal display (LCD) control circuit 214.

The display unit power supply voltage detection circuit 204 detects whether the power supply substrate 201 supplies a power supply voltage for operation of the display unit 11 to the display unit 11, and notifies the control substrate 203 of a detection result.

The display unit power supply control circuit 205 controls whether a power for the display unit 11 generated by the power supply substrate 201 is to be supplied in accordance with a signal received from the control substrate CPU 203. The display unit power supply control circuit 205 is implemented by a circuit using, for example, a field-effect transistor (FET).

The LAN controller 206 is an integrated circuit having a physical layer (PHY) function to perform network communication with the external apparatus via the LAN connector 13. The control substrate CPU 203 performs Management Data Interface (MDI) communication to configure a setting of a register included in the LAN controller 206, and thus controls network communication.

The LAN controller 206 performs Media independent Interface (MII) communication with a media access control (MAC) layer included in the control substrate CPU 203 to perform network communication via the LAN connector 13 in accordance with contents of the communication.

The LAN controller 206 also controls turning-ON of the LEDs 132 and 133 using the LED drive circuit for LAN 208 described below to issue notification of a status of the network communication with the external apparatus by the LEDs 132 and 133 in accordance with the register setting. The status of the network communication includes, for example, a link status between the LAN controller 206 and the external apparatus, link speed, and an operation condition during transmission and reception of data or the like.

While the LAN controller 206 is the integrated circuit having the PHY function in the present exemplary embodiment, the LAN controller 206 may be an integrated circuit having the PHY function and a MAC layer function (in this case, the MAC layer is not built into the control substrate CPU 203).

Alternatively, the control substrate CPU 203 may include both the MAC layer function and the PHY function (in this case, the LAN controller 206 is included in the control substrate CPU 203).

The LED drive circuit for CPU 207 is a circuit that turns ON/OFF the LEDs 132 and 133 using an LED control signals received from the control substrate CPU 203.

Since the turning-ON/OFF of the LEDs 132 and 133 is individually controlled, the LED control signals includes a control signal for the LED 132 and a control signal for the LED 133 that pass through respective two control signal lines.

The control signals described above are configured to turn ON the LED 132 and turn OFF the LED 133 after a power is supplied to the control substrate 202 and while the control substrate CPU 203 does not transmit a control signal to the LED drive circuit for CPU 207. A specific configuration example will be described with reference to FIG. 3.

The LED drive circuit for LAN 208 turns ON/OFF the LEDs 132 and 133 by the respective control signals for the LEDs 132 and 133 received from the LAN controller 206.

The display unit 11 includes a display unit substrate 211 and a liquid crystal display (LCD) 212. The display unit 11 serves as a function of notifying a user or a service engineer of information about an abnormal part by displaying an image on the LCD 212.

The display unit substrate 211 receives a power from the control substrate 202, has a function of converting image data received from the control substrate CPU 203 into a rendering signal to be rendered by the LCD 212 and transmits the rendering signal to the LCD 212. The display unit substrate 211 includes the display unit CPU 213 and the LCD control circuit 214. The display unit CPU 213 configures a setting of the display unit CPU 213 itself and a setting of the LCD control circuit 214 described below in accordance with a command received from the control substrate CPU 203, and transmits a status of the display unit substrate 211 as a command to the control substrate CPU 203. The LCD control circuit 214 converts image data received from the control substrate CPU 203 into a rendering signal to be rendered by the LCD 212. The display unit CPU 213 controls the LCD control circuit 214 to display the image on the LCD 212.

The LCD 212 displays the image in accordance with the rendering signal received from the display unit substrate 211.

Figure 3:
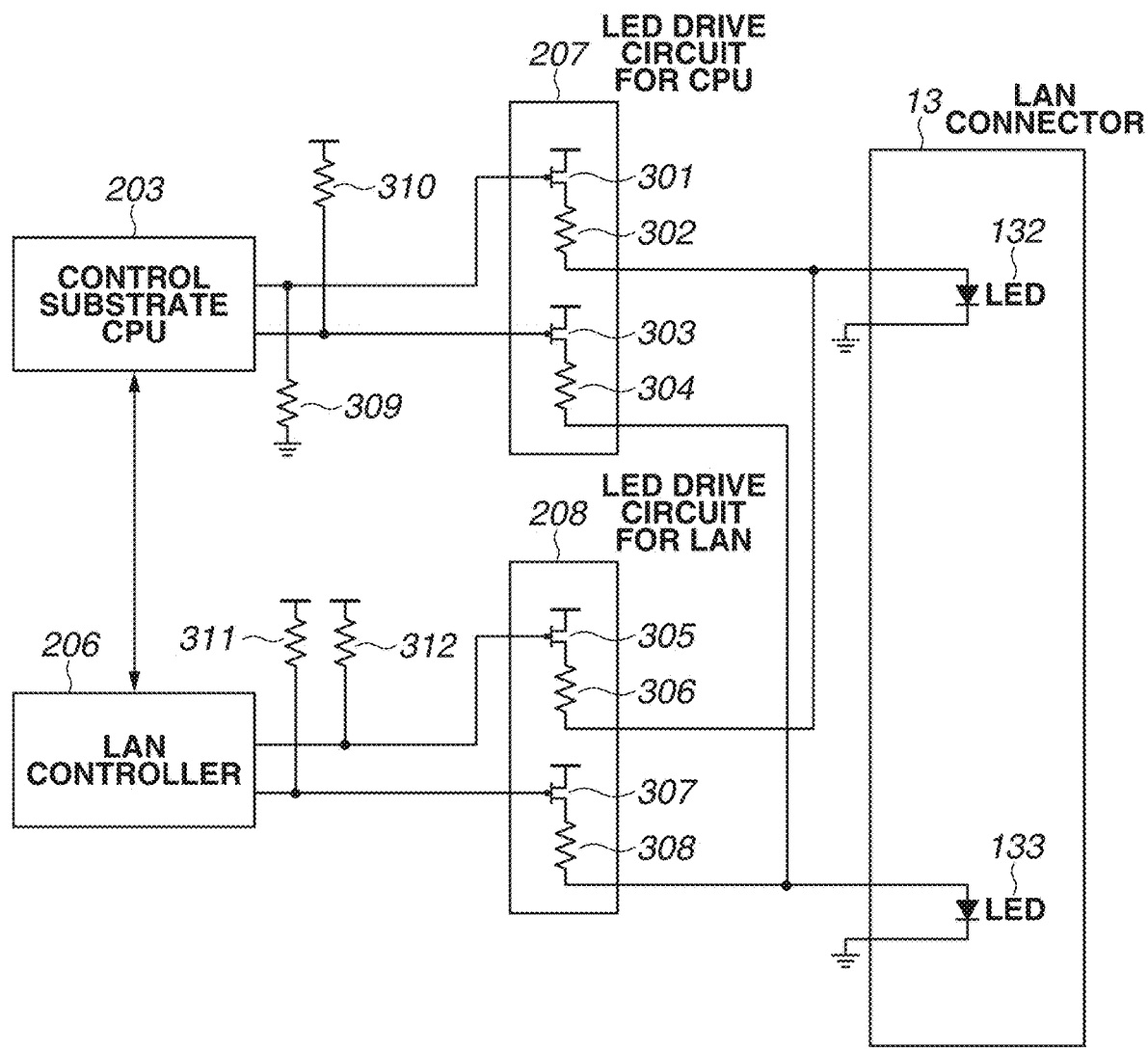
FIG. 3 is a block diagram illustrating an example of hardware configuration of a light emitting diode (LED) drive circuit for central processing unit (CPU) and an LED drive circuit for local area network (LAN).

FIG. 3 is a schematic diagram illustrating an example of an electric circuit including the LED drive circuit for CPU 207 and the LED drive circuit for LAN 208.

The LED control signal, for controlling emission (turning-ON/OFF) of the LED 132 by the control substrate CPU 203, is coupled (input) to a gate terminal of a P-channel FET 301 in the LED drive circuit for CPU 207.

The LED control signal, for controlling emission (turning-ON/OFF) of the LED 133 by the control substrate CPU 203, is coupled (input) to a gate terminal of a P-channel FET 303 in the LED drive circuit for CPU 207.

The LED control signal, for controlling emission (turning-ON/OFF) of the LED 132 by the LAN controller 206, is coupled (input) to a gate terminal of a P-channel FET 305 in the LED drive circuit for LAN 208.

The LED control signal, for controlling emission (turning-ON/OFF) of the LED 133 by the LAN controller 206, is coupled (input) to a gate terminal of a P-channel FET 307 in the LED drive circuit for LAN 208.

When a potential of the control signal coupled to each of the P-channel FETs 301, 303, 305, and 307 is close to a ground (GND) voltage (herein after referred to as low level), current flows in the LED 132 or the LED 133 to turn ON the LED 132 or the LED 133.

Meanwhile, when a potential of the control signal coupled to each of gate terminals of the P-channel FETs 301, 303, 305, and 307 is close to a power supply voltage (herein after referred to as high level), no current flows in the LED 132 or the LED 133, and accordingly the LED 132 or the LED 133 are turned OFF.

Resistors 302, 304, 306, and 308 are used to control an amount of current flowing in the LED 132 or the LED 133.

A resistance value of each of the resistors 302, 304, 306, and 308 satisfies a current value determined based on required light emitting brightness of the LEDs 132 and 133.

The LEDs 132 and 133 are semiconductors having different luminescent colors, and brightness when current of the same value flows therein and forward voltages applied thereto are also different form each other. Accordingly, a resistance value of the resistors 302 and 306 and a resistance value of the resistors 304 and 308 are determined to be different from each other to cause the LEDs 132 and 133 to emit light at the same brightness. For example, the resistance value of the resistors 302 and 306 is 510Ω, and the LED 132 emits light with current of about 3.5 mA passing therethrough. For example, the resistance value of the resistors 304 and 308 is 470Ω, and the LED 133 emits light with current of about 3.9 mA passing therethrough.

While the P-channel FET is used as a switch for the turning-ON control of the LEDs 132 and 133 according to the present exemplary embodiment, one or more transistors or semiconductor integrated circuits (ICs) may be used as a switch.

While in the present exemplary embodiment, the resistors 302, 304, 306, and 308 are used to limit a value of current flowing in the LED 132 or the LED 133, a current limit circuit including, for example, semiconductors may be used. While the LED drive circuit for CPU 207 and the LED drive circuit for LAN 208 are disposed upstream of the LEDs 132 and 133 in the present exemplary embodiment, the LED drive circuit for CPU 207 and the LED drive circuit for LAN 208 may be disposed downstream of the LEDs 132 and 133.

Since the LED 132 is connected to both the LED drive circuit for CPU 207 and the LED drive circuit for LAN 208, the LED 132 is turned ON by either one of the LED drive circuit for CPU 207 and the LED drive circuit for LAN 208 performing the turning-ON control. The LED 132 is turned OFF by both the LED drive circuit for CPU 207 and the LED drive circuit for LAN 208 performing the turning-OFF control.

Since the LED 133 is also connected to both the LED drive circuit for CPU 207 and the LED drive circuit for LAN 208, the LED 133 is turned ON by either one of the LED drive circuit for CPU 207 and the LED drive circuit for LAN 208 performing the turning-ON control. The LED 133 is turned OFF by both the LED drive circuit for CPU 207 and the LED drive circuit for LAN 208 performing the turning-OFF control.

In the two control signal lines from the control substrate CPU 203 to the LED drive circuit for CPU 207, a resistor 309 is coupled to the ground CND and resistors 310, 311, and 312 are coupled to a power supply to define an initial state of signals at the time of power-ON. That is, the resistor 309 is a pull-down resistor, and the resistors 310, 311, and 312 are pull-up resistors.

When power is supplied to the control substrate 202 and neither of the control substrate CPU 203 and the LAN controller 206 transmits a control signal to the LED drive circuit for CPU 207 and the LED drive circuit for LAN 208, respectively, terminals of the control substrate CPU 203 and the LAN controller 206 are in a high-impedance state. This brings the gate terminal of the P-channel FET 301 into the low level due to the resistor 309. Consequently, the P-channel FET 301 is turned ON, and accordingly the LED 132 is turned ON.

When power is supplied to the control substrate 202 and neither of the control substrate CPU 203 and the LAN controller 206 transmits a control signal to the LED drive circuit for CPU 207 and the LED drive circuit for LAN 208, respectively, the terminals of the control substrate CPU 203 and the LAN controller 206 are in the high-impedance state. This brings the gate terminal of the P-channel FET 303 into the high level due to the resistor 310 and brings the gate terminal of the P-channel FET 307 into the high level due to the resistor 311, Consequently, the P-channel FET 303 is turned OFF and the P-channel FET 307 is also turned OFF, and accordingly the LED 133 is turned OFF.

While the resistors 309 and 310 are mounted between the control substrate CPU 203 and the LED drive circuit for CPU 207 according to the present exemplary embodiment, the resistors 309 and 310 may be mounted in the LED drive circuit for CPU 207. The resistors 309 and 310 may be mounted in the control substrate CPU 203 as internal resistance independent of port control by the control substrate CPU 203.

Figure 4:
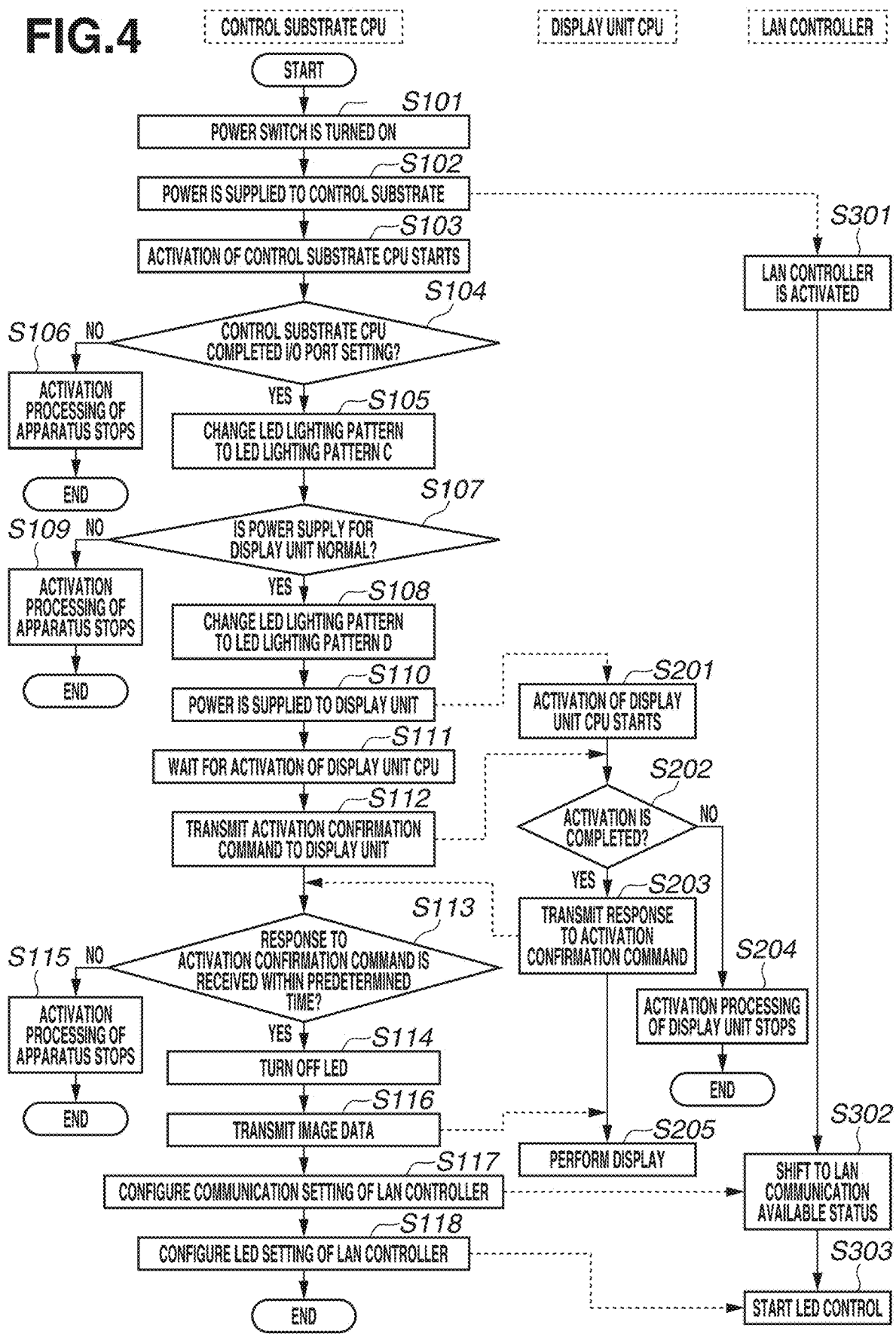
FIG. 4 is a flowchart illustrating an activation sequence of the information processing apparatus.

FIG. 4 is a flowchart illustrating an activation sequence of the information processing apparatus 1. In the activation sequence, the control substrate CPU 203 in the control substrate 202 executes a program. According to the present exemplary embodiment, the program includes a boot program to be first executed by the control substrate CPU 203 after a reset state is canceled. The boot program causes the control substrate CPU 203 to execute a series of processing to activate the information processing apparatus 1. That is, the boot program configures a setting to cause a plurality of input-output ports included in the control substrate CPU 203 to be usable. The boot program activates the display unit CPU 213 so that the display unit CPU 213 allows the LCD 212 to display information such as an image and a text. The boot program sets the LAN controller 206 so that the LAN controller 206 can communicate with the external apparatus and perform the turning-ON/OFF control of the LEDs 132 and 133.

A feature of the present exemplary embodiment is that the LEDs 132 and 133 are turned ON/OFF in accordance with an execution status of the boot program (progress status of a series of processing) until the display unit CPU 213 is activated and the display unit 11 can display information.

The control substrate CPU 203 performs a variety of processing indicated in the flowchart of FIG. 4 in accordance with the boot program.

When the power switch 12 is turned ON in step S101, the power supply substrate 201 supplies power (power of 5 V and 24 V according to the present exemplary embodiment) to the control substrate 202 in step S102.

Figure 5:
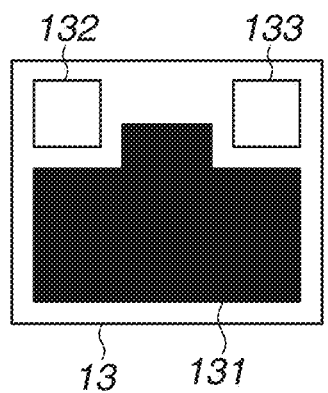
FIG. 5 is a diagram illustrating lighting patters of LEDs.
Figure 5:
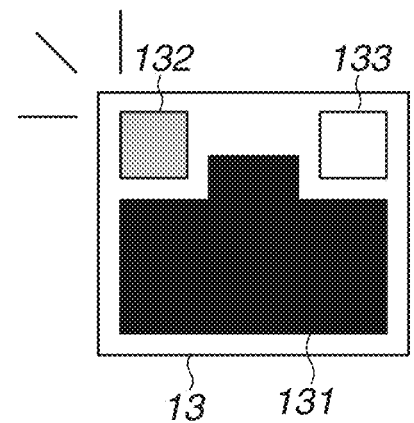
Figure 5:
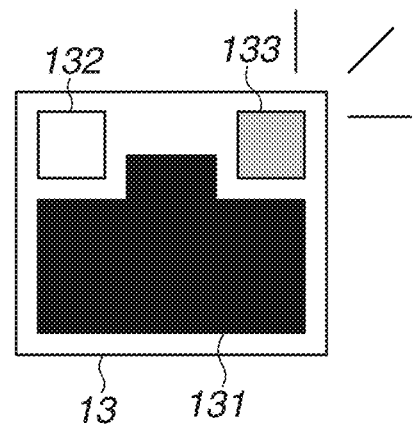
Figure 5:
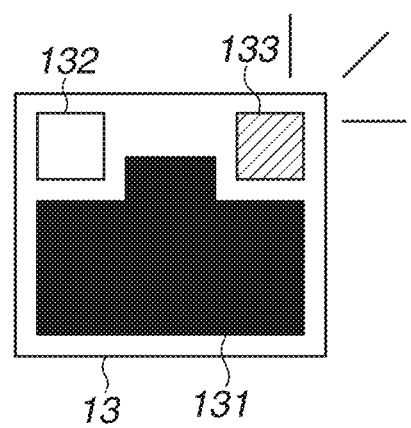

Both the LEDs 132 and 133 before the power-ON of the power switch 12 are OFF (LED lighting pattern A in FIG. 5).

In step S103, the control substrate CPU 203 receiving power supply (power) loads the boot program from a nonvolatile memory (not illustrated) and starts activation. In this process, the boot program has yet been executed and the LED 132 is turned ON without being controlled by the control substrate CPU 203 as described above. That is, a lighting pattern of the LED 132 is an LED lighting pattern B illustrated in FIG. 5.

In a case where the display unit 11 does not perform display and both the LEDs 132 and 133 of the LAN connector 13 are OFF even after the power switch 12 has been turned ON, the information processing apparatus 1 is considered to be in the following status. Power has not been supplied to the control substrate 202. Thus, if the apparatus stops with both the LEDs 132 and 133 being OFF, it can be determined that an abnormal part is a power supply unit (power switch 12, power supply substrate 201, and wire harness for power supply).

In step S301, power is supplied to the control substrate 202 and is also supplied to the LAN controller 206, and accordingly the LAN controller 206 is activated. However, the LAN controller 206 is in a stand-by state without being changed from an initial state until the register setting in the LAN controller 206 is configured by the control substrate CPU 203, and does not perform control of the LEDs or network communication. That is, the LAN controller 206 starts to control the LEDs 132 and 133 after the LAN controller 206 is set to be able to control the LEDs by the control substrate CPU 203. Further, the LAN controller 206 can communicate with the external apparatus after the LAN controller 206 is set to be able to communicate with the external apparatus by the control substrate CPU 203.

Immediately after the activation of the LAN controller 206, a terminal for the LED control signal of the LAN controller 206 connected to the LED drive circuit for LAN 208 is in the high-impedance state.

In a case where the control substrate CPU 203 has completed loading the boot program, the control substrate CPU 203 executes the readout boot program. The control substrate CPU 203 performs setting processing of a plurality of external input-output ports (I/O ports) included in the control substrate CPU 203 (YES in step S104). The I/O ports are used for the control substrate CPU 203 to communicate with peripheral devices. The peripheral devices include, for example, the display unit power supply voltage detection circuit 204, the display unit power supply control circuit 205, the LAN controller 206, the LED drive circuit for CPU 207, the display unit CPU 213, and the LCD control circuit 214. This setting is to set each I/O port as to whether it is used as an input port or as an output port. The control substrate CPU 203, for example, sets an I/O port, to which a signal line for the LED control signal for performing the turning-ON/OFF control of the LED 132 is connected, as the output port. The control substrate CPU 203 sets an I/O port, to which a signal line for the LED control signal for performing the turning-ON/OFF control of the LED 133 is connected, as the output port. Further, the control substrate CPU 203 sets an I/O port, to which a signal line for a reset control signal for controlling reset and cancellation of the reset of the LAN controller 206 is connected, as the output port. The control substrate CPU 203 controls an output level of the reset control signal output from the output port to bring the LAN controller 206 in a reset state. The control substrate CPU 203 also configures a setting of a communication control signal to the LAN controller 206.

After configuring the setting, the control substrate CPU 203 controls an output level of the LED control signal to change the LED lighting pattern from the LED lighting pattern B to an LED lighting pattern C. In step S105, the LED control signal for the LED 132 is controlled to be in the "high level" to turn OFF the LED 132, and the LED control signal for LED 133 is controlled to be in the "low level" to turn ON the LED 133, according to the present exemplary embodiment.

In a case where the control substrate CPU 203 is unable to execute the activation processing until the setting of the I/O ports for some reasons (e.g., abnormal readout of program) (NO in step S104), activation of the information processing apparatus stops in this status in step S106. That is, the LED lighting pattern remains the LED lighting pattern B illustrated in FIG. 5. In a case where the display unit 11 does not perform display and the LED 132 of the LAN connector 13 is in an "ON state" and the LED 133 of the LAN connector 13 is in the "OFF state" (remains in the LED lighting pattern B) even after the power switch 12 has been turned ON, the information processing apparatus is considered to be in the following status. Even though power is supplied to the control substrate 202, the activation of the control substrate CPU 203 has failed due to an abnormality on the control substrate 202 (such as failure of control substrate CPU 203, failure of substrate element, and abnormality of substrate wiring). Thus, if activation of the information processing apparatus 1 stops with the LED lighting pattern B, it can be determined that an abnormal part is the control substrate 202.

Subsequently, in step S107, the control substrate CPU 203 determines whether a power supply voltage (24 V according to the present exemplary embodiment) supplied to the display unit 11 is normal by checking a level of a signal from the display unit power supply voltage detection circuit 204.

In a case where the control substrate CPU 203 determines that the power supply voltage supplied to the display unit 11 is normal (YES in step S107), the processing proceeds to step S108. In step S108, the control substrate CPU 203 controls an output level of the LED control signal to change the LED lighting pattern from the LED lighting pattern C to an LED lighting pattern D. According to the present exemplary embodiment, the control substrate CPU 203 controls the LED control signal of the LED 132 to be the "high level" to turn OFF the LED 132. The control substrate CPU 203 then controls the LED control signal for the LED 133 to repeatedly switch between the "high level" and the "low level" every second to cause the LED 133 to blink.

Meanwhile, in a case where the control substrate CPU 203 determines that the power supply voltage provided to the display unit 11 is abnormal (NO in step S107), the processing proceeds to step S109. In step S109, the control substrate CPU 203 stops the activation processing of the information processing apparatus 1. That is, the LED lighting pattern remains the LED lighting pattern C illustrated in FIG. 5. In a case where the display unit 11 does not perform display and the LED 132 of the LAN connector 13 is in the "OFT state" and the LED 133 of the LAN connector 13 is in the "ON state" even though the power switch 12 has been turned ON, the information processing apparatus 1 is considered to be in the following status. Even though power for the control substrate (for control substrate CPU 203, LAN controller 206, and LAN connector 13) is normally supplied to the control substrate 202, the power supply for the display unit 11 is in an abnormal state. Thus, if the information processing apparatus 1 stops with the LED lighting pattern C, it can be determined that an abnormal part is a power supply unit for the display unit 11 (power supply substrate 201 and wire harness for power supply).

In step S110, after checking that no abnormality occurs in the power supply provided to the display unit 11, the control substrate CPU 203 outputs, to the display unit power supply control circuit 205, the control signal for supplying the power supply to the display unit 11. In step S201, when power is supplied to the display unit 11, activation of the display unit CPU 213 starts. In this manner, the control substrate CPU 203 activates the display unit CPU 213.

In step S111, the control substrate CPU 203 waits for enough time (200 ms according to the present exemplary embodiment) to complete the activation of the display unit CPU 213. In step S112, the control substrate CPU 203 then transmits an activation confirmation command to the display unit CPU 213.

In a case where the activation processing of the display unit CPU 213 has been completed normally (YES in step S202), the processing proceeds to step S203, In step S203, the display unit CPU 213 that has received an initialization command transmits a response to the activation confirmation command to the control substrate CPU 203. The response to the activation confirmation command corresponds to a signal indicating that the activation of the display unit CPU 213 has been completed.

In a case where the display unit CPU 213 cannot be activated normally due to, for example, an abnormality of the power supply in the display unit and a failure of the display unit CPU 213, the response to the activation confirmation command is not transmitted and the activation of the display unit 11 stops (NO in step S202).

In step S113, after transmitting the activation confirmation command to the display unit CPU 213, the control substrate CPU 203 determines if a response to the activation confirmation command from the display unit CPU 213 is received within predetermined time (within 10 ms according to the present exemplary embodiment).

In a case where the control substrate CPU 203 has received the response to the activation confirmation command from the display unit CPU 213 within the predetermined time (YES in step S113), the processing proceeds to step S114. In step S114, the control substrate CPU 203 controls the output level of the LED control signals to turn OFF the LEDs 132 and 133. That is, in step S114, the control substrate CPU 203 controls the LED control signal for the LED 132 to be the "high level" to turn OFF the LED 132, and controls the LED control signal for LED 133 to be the "low level" to turn OFF the LED 133.

In a case where the predetermined time has elapsed without reception of the activation confirmation command (NO in step S113), activation of the information processing apparatus 1 stops in this status in step S115. That is, the LED lighting pattern remains the LED lighting pattern D illustrated in FIG. 5. In a case where the display unit 11 does not perform display and the LED 132 of the LAN connector 13 is in the "OFF state", and the LED 133 of the LAN connector 13 is in a "blinking state" even though the power switch 12 has been turned ON, the information processing apparatus 1 is considered to be in the following status. Even though the control substrate CPU 203 operates normally and the power for the display unit is supplied, the display unit 11 is in an inoperable status. Thus, if the information processing apparatus 1 stops while remaining in the LED lighting pattern D, it can be determined that an abnormal part is in a transmission unit between the control substrate 202 and the display unit 11 or within the display unit 11.

In step S116, the control substrate CPU 203 transmits image data to the LCD control circuit 214 of the display unit 11. In step S205, the LCD control circuit 214 that has received the image data causes the LCD 212 to perform display in accordance with the received image data.

From this point onward, when the abnormality of the information processing apparatus 1 has been detected, the LCD control circuit 214 causes the LCD 212 of the display unit 11 to display information about the abnormal part, instead of the display of an abnormality using the LEDs 132 and 133.

The control substrate CPU 203 controls a reset control signal for the LAN controller 206 and sets the reset control signal in a reset cancellation state. The control substrate CPU 203 rewrites the setting value of the register in the LAN controller 206 to determine an operation mode or the like of the LAN controller 206 via a communication line to the LAN controller 206. In step S117, the control substrate CPU 203 configures a setting to start network communication with the outside via the communication line to the LAN controller 206.

In step S302, the LAN controller 206 configured by the control substrate CPU 203 to be able to communicate with the external apparatus starts communication with the external network via the LAN connector 13.

Subsequently, in step S118, the control substrate CPU 203 configures an LED control setting of the LAN controller 206 via the communication line. In step S303, the LAN controller 206 configured by the control substrate CPU 203 to be able to perform turning-ON/OFF control of the LEDs 132 and 133 performs turning-ON control of the LEDs 132 and 133 in accordance with a network communication status (operation status) the LAN controller 206 performs the turning-ON control of LEDs 132 and 133 by outputting the LED control signals to the LED drive circuit for LAN 208.

From this point onward, the LAN controller 206 performs the turning-ON/OFF controls of the LEDs 132 and 133 in accordance with the network communication status, and the control substrate CPU 203 does not perform the turning-ON/OFF control.

According to the present exemplary embodiment, as described above, the control substrate CPU 203 controls the turning-ON of the LEDs 132 and 133 that are also turned ON by the LAN controller 206. This eliminates the need for providing another LED that is turned ON by the control substrate CPU 203, in addition to the LEDs 132 and 133, and accordingly a cost increase can be prevented.

Even though notification of the network communication status, which is a primary role of the LEDs of the LAN connector 13, cannot be performed after the power-ON of the power switch 12 until the display start of the display unit 11, it becomes available after the display unit 11 is able to perform display at the time of the activation of the apparatus.

According to the control and configuration described above, cost increase can be prevented, and the user can be notified of the abnormal part if the abnormality occurs after the power-ON of the power switch 12 until the display start of the display unit 11, without placing a limit on practical functions. This can prompt the user to operate proper recovery processing.

While the display unit 11 displays an image to notify the user or the service engineer of the information about the abnormal part according to the present exemplary embodiment, a notification unit for notifying such information may be a speaker. The abnormal part may be notified, for example, by voice through the speaker.

According to the present exemplary embodiment, the light emitting unit that is turned ON/OFF by other than a program execution unit can be turned ON/OFF by the program execution unit.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the present disclosure is not limited to the particular disclosed exemplary embodiments. The scope of the following claims is to be accorded the broadest interpretation so as to encompass all such modifications and equivalent structures and functions.

While the present disclosure has been described with reference to exemplary embodiments, it is to be understood that the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-056273, filed Mar. 25, 2019, which is hereby incorporated by reference herein in its entirety.

What is claimed is:

1. An information processing apparatus comprising:
a display;
a connector, to which a communication cable to communicate with an external apparatus can be connected;
a light emitting unit disposed to the connector;
a memory device that stores a set of instructions; and
at least one processor that executes the instructions, the instructions, when executed, causing the information processing apparatus to perform operations comprising:
an execution unit configured to execute a boot program;
a communication unit configured to communicate with the external apparatus via the connector;
a first control unit configured to perform turning-ON/OFF control of the light emitting unit in accordance with an execution status of the boot program by the execution unit, until the display is enabled to display information in accordance with the execution of the boot program;
a second control unit configured to perform turning-ON/OFF control of the light emitting unit in accordance with a status of communication with the external apparatus by the communication unit, after the display is enabled to display information.

2. The information processing apparatus according to claim 1, wherein the boot program executed by the execution unit is configured to perform a series of processing after power is supplied to the execution unit, and turn ON/OFF the light emitting unit in accordance with a progress status of the series of processing.

3. The information processing apparatus according to claim 2,
wherein the execution unit includes a plurality of input-output ports that are used for communication with other devices, and
wherein the series of processing includes setting processing of the input-output ports.

4. The information processing apparatus according to claim 2,
wherein the series of processing includes processing to supply power to the display unit.

5. The information processing apparatus according to claim 4, wherein the series of processing includes processing to cause the display unit to display the information.

6. The information processing apparatus according to claim 2, wherein the series of processing includes processing to set the communication unit to be capable of communicating with the external apparatus.

7. The information processing apparatus according to claim 2, wherein the series of processing includes processing to set the communication unit to be capable of performing the turning-ON/OFF control of the light emitting unit.

8. The information processing apparatus according to claim 1, wherein the communication unit is configured not to turn ON/OFF the light emitting unit until the execution unit executes the boot program to perform predetermined processing.

9. The information processing apparatus according to claim 1, wherein each of the execution unit and the communication unit is configured to output a control signal for performing the turning-ON/OFF control of the light emitting unit.

10. The information processing apparatus according to claim 9, wherein the light emitting unit is turned ON when either of the execution unit and the communication unit outputs a control signal for turning ON the light emitting unit.

11. The information processing apparatus according to claim 9, further comprising:
a circuit to which the control signal is input and configured to output current to the light emitting unit in accordance with the control signal input to the circuit; and
another circuit to which another control signal is input and configured to output current to the light emitting unit in accordance with the another control signal input to the another circuit,
wherein the light emitting unit is configured to be turned ON when current is input to the light emitting unit.

12. The information processing apparatus according to claim 1, wherein the execution unit is a central processing unit (CPU).

13. The information processing apparatus according to claim 1, wherein the communication unit is a local area network (LAN) controller.

14. The information processing apparatus according to claim 1, wherein the light emitting unit is two light emitting diodes (LEDs).

15. The information processing apparatus according to claim 1, wherein the light emitting unit is configured to be turned ON/OFF in accordance with an execution status of the boot program.

16. A control method of an information processing apparatus, the information processing apparatus having a connector to which a communication cable to communicate with an external apparatus can be connected, the control method comprising:
executing a boot program;
performing first control of turning ON/OFF a light emitting unit disposed to the connector in accordance with an execution status of the boot program;
communicating with the external apparatus after the executing of the boot program;
performing turning-ON/OFF control of the light emitting unit in accordance with an execution status of the boot program by the executing, until a display is enabled to display information in accordance with the execution of the boot program; and
performing second control of turning ON/OFF the light emitting unit in accordance with a status of the communication with the external apparatus by the communicating, after the display is enabled to display information.

17. The control method of the information processing apparatus according to claim 16,
wherein the executing of the boot program performs a series of processing after a power switch of the information processing apparatus is turned ON and performs the first control, and
wherein in the first control, the light emitting unit is turned ON/OFF in accordance with a progress status of the series of processing.

* * * * *